United States Patent [19]
Bond et al.

[11] 3,771,048
[45] Nov. 6, 1973

[54] SEALED CONTACT SWITCH TESTING APPARATUS UTILIZING HELMHOLTZ COILS

[75] Inventors: Robert Harold Bond; Robert Owen Bridges, both of Winston-Salem, N.C.

[73] Assignee: Western Electric Company, Incorporated, New York, N.Y.

[22] Filed: Apr. 13, 1972

[21] Appl. No.: 243,777

[52] U.S. Cl. ................ 324/28 RS, 324/34 RS
[51] Int. Cl. ................ G01r 31/02, G01r 33/00
[58] Field of Search ................ 324/28 RS, 28 R, 324/34 RS; 209/75; 29/593, 622

[56] References Cited
UNITED STATES PATENTS

| | | | |
|---|---|---|---|
| 3,609,524 | 9/1971 | Kazmer | 324/28 RS |
| 2,885,076 | 5/1959 | House et al. | 324/28 RS |
| 2,924,333 | 2/1960 | Kulick et al. | 209/75 |

OTHER PUBLICATIONS

Bradford et al.; "Estimating Sealed..."; Bell Labs Record; May 1966; pg. 159–161.

*Primary Examiner*—Rudolph V. Rolinec
*Assistant Examiner*—Ernest F. Karlsen
*Attorney*—W. M. Kain et al.

[57] ABSTRACT

An apparatus for testing sealed contact switches utilizes a pair of spaced coaxial coils with a conveyor mechanism passing between the coils for holding and indexing the switches individually to a position along the axis of the coils. The coils have a mean radius which is equal to the distance between the mean planes of the coil. Facilities apply an increasing and then decreasing current through the coils to test the switches for operate and release points. Also facilities apply a fixed current to the coils for holding the switches closed to measure contact resistance.

5 Claims, 3 Drawing Figures

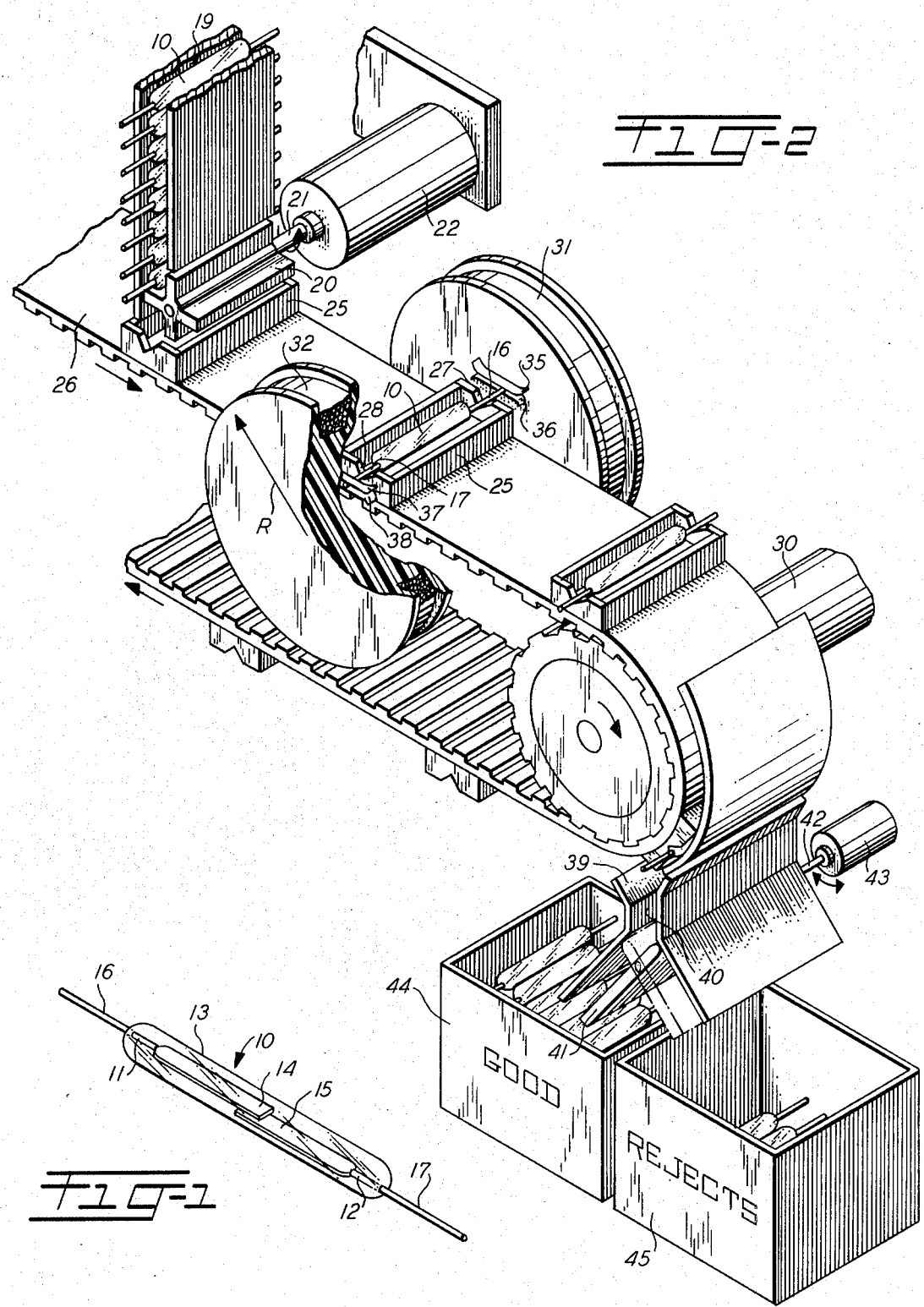

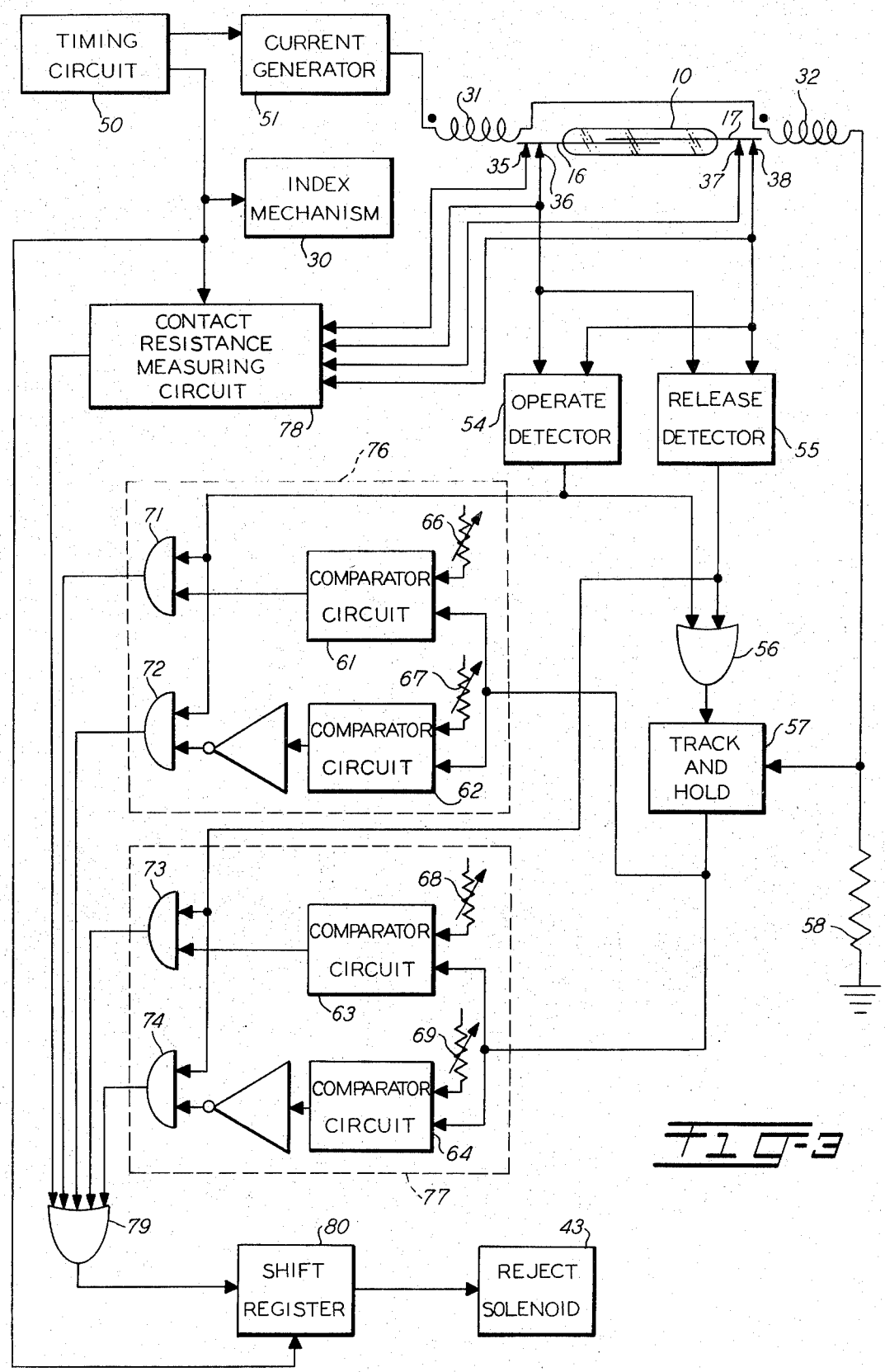

3,771,048

SEALED CONTACT SWITCH TESTING APPARATUS UTILIZING HELMHOLTZ COILS

BACKGROUND OF THE INVENTION

1. Field of the Invention

Sealed contact switches are utilized in many switching and control systems, for example, telephone switching networks. In order to insure that sealed contact switches being manufactured meet specifications, it is necessary to test each switch to insure that the switch closes and opens at respective predetermined magnitudes of magnetic field intensity and that the contact resistance is below a predetermined magnitude.

2. Prior Art

There are a number of sealed contact testing apparatus described in the prior art. One such apparatus is described in U.S. Pat. No. 2,924,333 issued to F. Kulick, J. W. McGrath, and A. H. Spence on Feb. 9, 1960. The apparatus automatically feeds a sealed contact switch longitudinally into the core of a test solenoid where thes test solenoid is excited and the contacts of the switch are tested to determine operate and release points of the sealed contact switch.

Another apparatus for testing sealed contact switches is shown on page 160 of an article entitled "Estimating Sealed Reed Contact Forces" by K. F. Bradford and F. E. Bader in the Bell Laboratories Record, May, 1966, Vol. 44, No. 5. This apparatus shows a sealed contact switch inserted longitudinally into a pair of closely spaced coaxial coils.

Prior art literature describes the Helmholtz coil arrangement. One such reference is contained in the *Standard Handbook for Electrical Engineers*, 10th Edition, 1968, by McGraw-Hill Book Co., in Section 3, paragraph 235, page 81.

SUMMARY OF THE INVENTION

An object of the invention is a new and improved automatic testing apparatus for sealed contact switches.

Another object of the invention is an apparatus for testing sealed contact switches at faster rates than can be obtained by the longitudinal feeding mechanisms on prior art testing apparatus.

A further object of the invention is a sealed contact testing apparatus which eliminates jarring and damage which were common on prior art testing apparatus for sealed contact switches.

A still further object of the invention is an apparatus for testing sealed contact switches which produces more uniform results in the testing of the switches.

In accordance with these and other objects of the invention, an apparatus for testing sealed contact switches incorporates a pair of coaxial coils spaced apart by a distance exceeding the length of the sealed contact switch. Each of the coils have a mean radius of about 50 to 200 percent the distance between means planes thereof. Conveyor mechanism individually indexes sealed contact switches transversely between the coils to a position along the axis of the coils. Facilities energize the coils and test a characteristic of the sealed contact switches.

BRIEF DESCRIPTION OF THE DRAWING

FIG. 1 illustrates a sealed contact switch;

FIG. 2 shows an apparatus for individually conveying sealed contact switches between a Helmholtz coil arrangement in accordance with the principles of the invention; and FIG. 3 shows a circuit for testing the sealed contact switches for operate and release points and for contact resistance.

DETAILED DESCRIPTION

Referring first to FIG. 1, there is shown a sealed contact switch 10 having a pair of reeds 11 and 12 encapsulated in a glass enclosure 13. The reeds 11 and 12 have respective flattened portions 14 and 15 inside the enclosure 13 and lead portions 16 and 17 extending outside the enclosure 13. When a longitudinal magnetic field of sufficient strength is applied to the switch 10, the flattened portions 14 and 15 of the reeds 11 and 12 are forced into engagement with each other and complete an electrical circuit between the leads 16 and 17.

Referring to FIG. 2, there is shown a plurality of sealed contact switches 10—10 within a feed input passageway 19. The sealed contact switches 10—10 are fed into the input passageways 19 by suitable facilities (not shown), such as a vibrating bowl or a magnetic bin feed mechanism. An escapement mechanism, comprising a slotted wheel 20 mounted on a shaft 21 and driven by a rotary motor or solenoid 22, selectively discharges individual contact switches 10 into a receptacle 25 of a conveyor 26. The receptacle 25 has a pair of notches 27 and 28 for receiving the respective leads 16 and 17 of the sealed contact switch 10.

Suitable mechanism 30 indexes the conveyor 26 to transversely move the sealed contact switches 10-10 to a testing station between a pair of spaced coaxial coils 31 and 32. The coils 31 and 32 are spaced a distance apart which is greater than the longitudinal length of the sealed contact switch 10 being tested. The coils 31 and 32 have a mean radius R which is generally from about 50 to 200 percent the distance between mean planes of the respective coils 31 and 32. Preferably the radius R is from 80 to 120 percent of the distance between mean planes of the coils 31 and 32. In accordance with the known principles of the Helmholtz coil arrangement, there is produced between the coils 31 and 32 a substantially uniform field in the general vicinity surrounding the axis through the coils. Thus, small variations in the positioning of the switches 10—10 in the testing station do not result in variations in the test results of the switches 10—10.

Four brush contacts 35, 36, 37, and 38 are mounted on the sides of the supporting structures for the coils 31 and 32 to engage the respective leads 16 and 17 when the conveyor 26 indexes the switch 10 between the coils 31 and 32. The contacts 35–38 connect the leads 16 and 17 to a testing circuit shown in FIG. 3 to determine properties of the switch 10. After the switch 10 has been tested, the conveyor 26 indexes the switch 10 to an unloading station 39 where the switch 10 is discharged into a passageway 40. The passageway 40 has a vane 41 mounted on a shaft 42, which is operated by a rotary solenoid 43, to deflect the switches 10—10 into bins 44 and 45 in accordance with the results of the test.

The conveyor 26, the receptacles 25, and brushes 35–38 and the supporting structure for the coils 31 and 32 are made from suitable materials which do not have any ferro-magnetic properties and which have relative permeabilities near to one. Also, the spacing between adjacent receptacles 25 is sufficient to prevent the switches in adjacent receptacles from having a significant effect on the magnetic field between the coils 31 and 32.

Referring now to FIG. 3, there is shown one example of a testing circuit for testing the sealed contact switches 10. A timing circuit 50, such as an oscillator controlled binary counter, motor driven cam circuit, or the like, initiates a cycle of a current generator 51. The timing circuit 50 also operates the indexing mechanism 30. The generator 51 first produces a linearly increasing and then decreasing or ramp current pulse through the coils 31 and 32. Then the generator 51 produces a constant current for a predetermined duration through the coils 31 and 32. During the ramp current pulse, the operate and release points of the switch 10 are compared with respective limits to determine if the switch operates within acceptable ranges of magnetic field intensity. During the constant current, the contact resistance of the switch 10 is measured to determine if the contact resistance is within acceptable limits.

For testing the operate and release points of the switch 10, the contacts 36 and 38 connect the respective leads 16 and 17 to an operate detector 54 and a release detector 55. The operate detector 54 produces an output pulse when the switch 10 closes and the release detector 55 produces an output pulse when the switch 10 opens. The detectors 54 and 55, for example, may be monostable multivibrators which are triggered by the respective closing and opening of the switch 10. The output pulses of the operate detector 54 and the release detector 55 are applied through on OR gate 56 to a track and hold circuit 57. The track and hold circuit 57 is a conventional circuit which produces an output voltage that follows the voltage produced across a current sensing resistor 58 in series with the coils 31 and 32 until a trigger input from OR gate 56 is pulsed. During the duration of the trigger input pulse, the output voltage of the track and hold circuit 57 is held at the level of voltage present across the resistor 58 at the initiation of the trigger pulse. One example of such a track and hold circuit is described in U.S. Pat. No. 3,610,958 to Paul A. Reiling issued on Oct. 5, 1971.

The output of the track and hold circuit 57 is applied to inputs of comparator circuits 61-64. The comparator circuits 61-64 have respective adjustable resistors 66-69 therein, or some other means, for providing different reference levels for the comparator circuits 61-64. The outputs of comparator circuits 61 and 63 are applied to respective AND gates 71 and 73 while the outputs of comparator circuits 62 and 64 are inverted and applied to respective AND gates 72 and 74. Gates 71 and 72 are controlled by the operator detector 54 while gates 73 and 74 are controlled by the release detector 55. The comparator circuits 61 and 62 and the gates 71 and 72 form an operate limit test circuit 76, and the comparator circuits 63 and 64 and the gates 73 and 74 form a release limit test circuit 77. The comparator circuit 61 is set to operate and produce an output when the output of the track and hold circuit 57 exceeds a high limit. The comparator circuit 62 is set to operate when the output of the track and hold circuit 57 exceeds a low limit. An error signal is produced on one of the gates 71 or 72 if the switch 10 closes at too high a magnetic field intensity or at too low a magnetic field intensity. No error signal is produced by the gates 71 and 72 if the switch 10 closes at a magnetic field intensity between the selected limits. Similarly, the comparator circuit 63 is set for a high limit while the comparator circuit 64 is set for a low limit to produce an error signal on one of the gates 73 or 74 if the switch 10 opens at too high a magnetic field intensity or at too low a magnetic field intensity. No error signal is produced by the gates 73 and 74 if the switch 10 opens at a magnetic field intensity between the selected limits.

For testing the contact resistance, the contacts 35-38 connect the respective leads 16 and 17 in a Kelvin connection to a contact resistance measuring circuit 78. The circuit 78 provides a current through two of the leads 35 and 37 while measuring the voltage drop across the other leads 36 and 38. If the voltage drop is below a predetermined limit, the circuit 78 produces no output to indicate that the contact resistance is acceptable. If the voltage drop is above the predetermined limit, the circuit 78 produces an output indicating that the contact resistance of the switch 10 is not acceptable.

The outputs of the gates 71-74 and the output of the contact resistance measuring circuit 78 are applied to an OR gate 79 which operates a memory device, such as a shift register 80, if a switch 10 is not acceptable. The register 80 is stepped by the timing circuit 50 to correspond to the number of index steps between the testing station and the unloading station 39. When the switch reaches the unloading station, an error signal in the shift register 80 operates the reject solenoid 43 to cause the rejection of the switch 10.

The above-described embodiment of the invention is simply illustrative of the principles of the invention. Many embodiments may be devised without departing from the scope and spirit of the invention. For example, the conveyor 26, the receptacles 25, the loading mechanism 19, 20, etc. could be replaced with a magnetic feeding bin such as is described in U.S. Pat. No. 3,537,580 to J. E. Beroset and D. M. Large issued on Nov. 3, 1970, and a non-magnetic slotted wheel for removing the switches from the bin and indexing the switches to a position between the coils 31 and 32. Also, many different types of testing circuits could be used. One example of another testing circuit is described in U.S. Pat. No. 2,924,333 to F. Kulick et al issued on Feb. 9, 1960. In still another type of testing circuit, the operate limit test circuit 76, the release limit test circuit 77, the gate 79 and register 80 could be replaced by a digital voltmeter and a general purpose digital computer programmed to provide the various functions described herein. The actual values of operate and release magnetic field intensity along with contact resistance could be measured and/or recorded for use in controlling manufacturing processes, pairing selected switches, or statistical analysis.

What is claimed is:

1. An apparatus for testing a sealed contact switch, comprising:
   a pair of coaxial coils spaced apart by a distance greater than the length of the sealed contact switch and each coil having a mean radius of about 50 to 200 percent of the distance between the mean planes of the pair of coils;
   conveyor means passing between the coils in a direction parallel to the planes of the coils for holding and indexing a sealed contact switch to a longitudinal position in the vicinity of the axis of the pair of coils; and means for energizing the coils and testing a characteristic of the sealed contact switch.

2. An apparatus as defined in claim 1, wherein the testing means includes a circuit for detecting the operate and release points of the sealed contact switch and the ampere-turns through the pair of coils to determine if the operate and release points of the sealed contact switch are satisfactory.

3. An apparatus as defined in claim 1, wherein the testing means includes a contact resistance measuring circuit for determining if the contact resistance of the sealed contact switch is acceptable.

4. An apparatus as defined in claim 1, wherein each of the pair of coaxial coils have a mean radius of about 80 to 120 percent of the distance between the mean planes of the pair of coils.

5. An apparatus as defined in claim 4, wherein the testing means includes:
a circuit for detecting the operate and release points of the sealed contact switch and the ampere-turns through the pair of coils to determine if the operate and release points of the sealed contact switch are satisfactory; and
a contact resistance measuring circuit for determining if the contact resistance of the sealed contact switch is acceptable.

* * * * *